May 8, 1934. H. G. HAMER 1,958,000
PARACHUTE APPARATUS
Filed Sept. 26, 1929 6 Sheets-Sheet 1

Hilbert Guslav Hamer Dec'd.
INVENTOR.
Mary Annie Hamer
Administratrix
BY
ATTORNEYS.

Patented May 8, 1934

1,958,000

UNITED STATES PATENT OFFICE 1,958,000

PARACHUTE APPARATUS

Hilbert Gustav Hamer, deceased, late of Letchworth, England, by Mary Annie Hamer, administratrix, Letchworth, England, assignor to Irving Airchute of Great Britain, Ltd., Letchworth, England Application September 26, 1929, Serial No. 395,399
In Great Britain October 2, 1928

30 Claims. (Cl. 244—21)

This invention relates to improvements in parachute apparatus.

The primary object of the invention is the provision of parachute apparatus consisting of a container adapted to receive a folded parachute therein in pack form; improved means being provided for quick attachment of the pack in a safe and convenient manner to the harness or appropriate clothing of the aviator, passenger, or parachutist desiring to use the same.

The present parachute apparatus which is in extensive use throughout the world, exemplified in the parachute pack U. S. patent of G. M. Ball, #1,554,192, patented September 22, 1925, and the parachute harness, U. S. patent of G. M. Ball, #1,560,366, patented November 3, 1925, relates to structure in which the pack is inseparably connected with the harness, so that the pack cannot be disconnected from the harness and quickly and safely attached thereto only when desired for use. Prior hereto there have been devices conceived, and even developed in structure, contemplating a pack which may be detachable from its harness, when not in use. For instance, there is the one-point suspension type heretofore developed by Leslie L. Irvin of the Irving Airchute Company, of Great Britain, Ltd. A defect of this type of connector was the inability of the wearer to control his movements while falling. Other types of packs detachable from the wearer's harness are set forth in the U. S. Floyd Smith Patents #1,367,723 and #1,462,456, which have the disadvantages of location of the pack upon the wearer in such manner that it cannot be quickly attached for emergency purposes. In present day parachute apparatus there should be a very high factor of safety, and the present application relates to relatively detachable pack and harness apparatus having complementary connector parts which may be quickly, and with facility brought into an interconnected relation, in a convenient position upon the wearer, with a high factor of safety due to structural arrangement.

A further object of this invention is the provision of parachute apparatus which consists of a pack including a container having a parachute canopy adapted to be connected therein by means of shroud lines bunched together and connected at a plurality of spaced points at the inside of the container; the container and harness having a plurality of relatively spaced connectors, each of which includes complementary parts upon the harness and pack container; the arrangement being such that if for any reason the wearer, during emergency use, is unable to complete the connection at more than one fastener, the device will still operate efficiently, by reason of the transverse shroud line connection at the inside of the container.

A further object of this invention is the provision of parachute apparatus including relatively detachable pack and harness units, with a plurality of fastening means, each having complementary parts fitted respectively to the parachute pack and harness, with means associated therewith to maintain the complementary parts in a position which will enable the user to quickly, and with facility register the complementary parts and expedite their mutual engagement in the required manner.

A further object of this invention is the provision of parachute apparatus adaptable for emergency use, comprising harness or the like worn during flight, and a parachute pack; the pack and harness having complementary fastening means for facile attachment of the pack in a detachable relation at the front of the wearer.

A further object of this invention is the provision of safety parachute apparatus embodying a harness and a conveniently detachable pack connected therewith; the interconnection between the harness and the pack being accomplished without prior extension of suspension lines or straps.

A further object of this invention is the provision of safety parachute apparatus for emergency use comprising harness worn by the user, and a pack, the pack having means for operative connection to the conventional suspension lines of the harness without any other connection upon the body of the wearer.

Other objects and advantages of this invention will be apparent during the course of the following detailed description.

In the accompanying drawings, forming a part of this specification, and wherein similar reference characters designate corresponding parts throughout the several views.

In the drawings, wherein for the purpose of illustration are shown preferred and modified forms of the invention, the letter A may generally designate a set of harness adapted to be worn by an individual, with which the pack B is adapted to be detachably connected.

Figure 1:
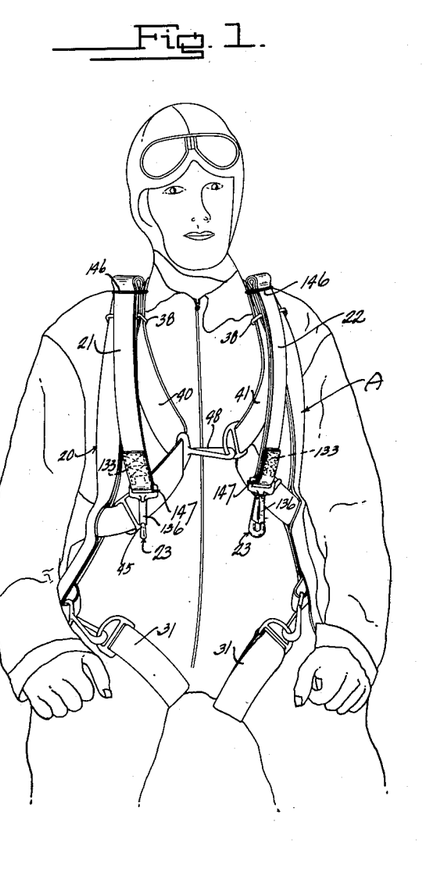
Figure 1 is a view showing safety parachute harness upon an aviator, with the suspension straps connected in a novel relationship upon the harness, so as to permit the facile attachment of a parachute pack thereto.
Figures 3, 17, 18:
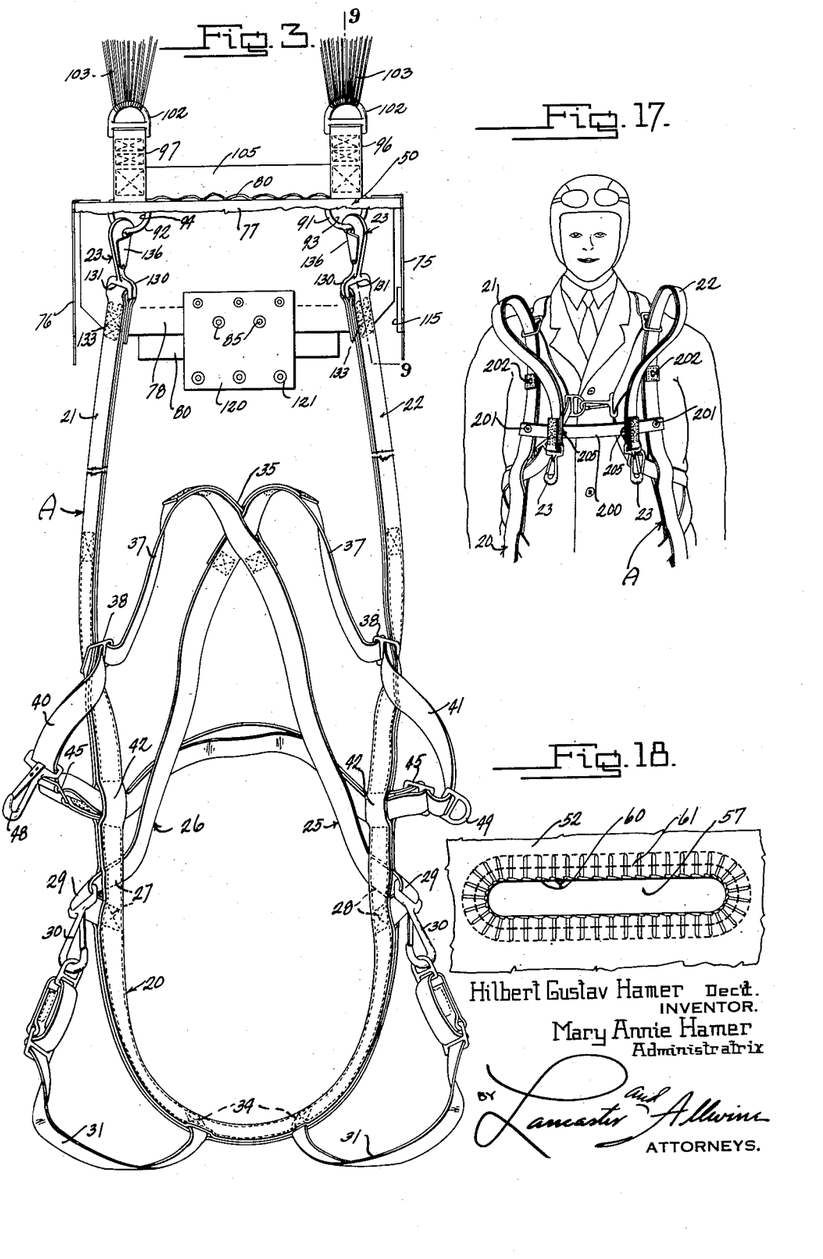
Figure 3 is a fragmentary perspective view, partly in section, showing the harness open, to better illustrate the details thereof, with the container and shroud lines operatively interconnected to the ends of the suspension lines of the harness, in the position which they will occupy during use; a flap of the container being broken away to better illustrate the connectors and the complementary fastener parts.
Figure 17 is a further modified adjustable suspension strap connection for the harness.
Figure 18 is an enlarged fragmentary view of a portion of the parachute pack container wherein a slot is provided for receiving the metal connecting members for connecting the shroud lines and suspension line fasteners at opposite sides of the body of the pack container.

Referring to the harness A, the same is preferably constructed of tightly woven cotton webbing of the character generally used for present day parachute apparatus, although it is within the range of this invention that the specific harness shown may be substituted by other apparel, since it is contemplated that in future parachute apparatus the clothing of the flyer may be suitably constructed to carry the suspension lines in a properly reinforced relation. However, for the purposes of this invention the harness may be of the general type set forth in U. S. Patent #1,560,366; the same comprising a substantially U-shaped main body strap or sling 20, consisting of a pair of lengths of the webbing superposed, and stitched together, as shown in Figure 3 of the drawings, to provide a substantially U-shaped sling, of which the end portions 21 and 22 form the suspension straps which are connected by intermediate means to the parachute canopy. At their free ends the suspension straps 21 and 22 are provided with novel snap fasteners 23, of a nature to be subsequently described, each being a complement of the connector means by which the harness is detachably associated with the pack. Adjustable body encircling straps 25 and 26 are provided, connected at their lower ends at 27 and 28 respectively, to opposite sides of the U-shaped sling 20, between the lengths of material thereof, to define flexible loops 29, receiving snap fasteners 30 thereon by means of which the leg encircling straps 31 may be detachably connected. The straps 31 are connected at their opposite ends 34 in a fixed relation near the seat or bight of the sling 20. The straps or webbing links 25 and 26 extend upwardly from their connections 27 and 28, and are adapted to project around the sides and across the back of the wearer, being adjustably held together at 35, at the center of the back of the wearer, and extending diagonally therefrom, providing shoulder portions 37 adjustably threaded through connecting buckles 38 upon the intermediate portions of the sides of the U-shaped link 20, as shown in Figure 3. The adjustable strap portions 25 and 26 are extended from the adjustable buckles 38 in a looped relation at 40 and 41, at opposite sides of the U-shaped sling, and threaded at 42 through suitable passageways provided between the lengths of material of the sling; the straps 25 and 26 therefrom being loosely extended in superposed relation across the back of the wearer and being adjustably connected by buckles 45 to each other in a relation which will permit the adjustment of the waist strap at the back of the wearer to accommodate the stature of the wearer. The looped portions 40 and 41 thus provided, have freely movable snap fastener parts 48 and 49 thereon, which are adapted to be snapped across the front of the wearer to encircle the harness about the wearer, as shown in Figure 1 of the drawings.

Figures 4, 5:
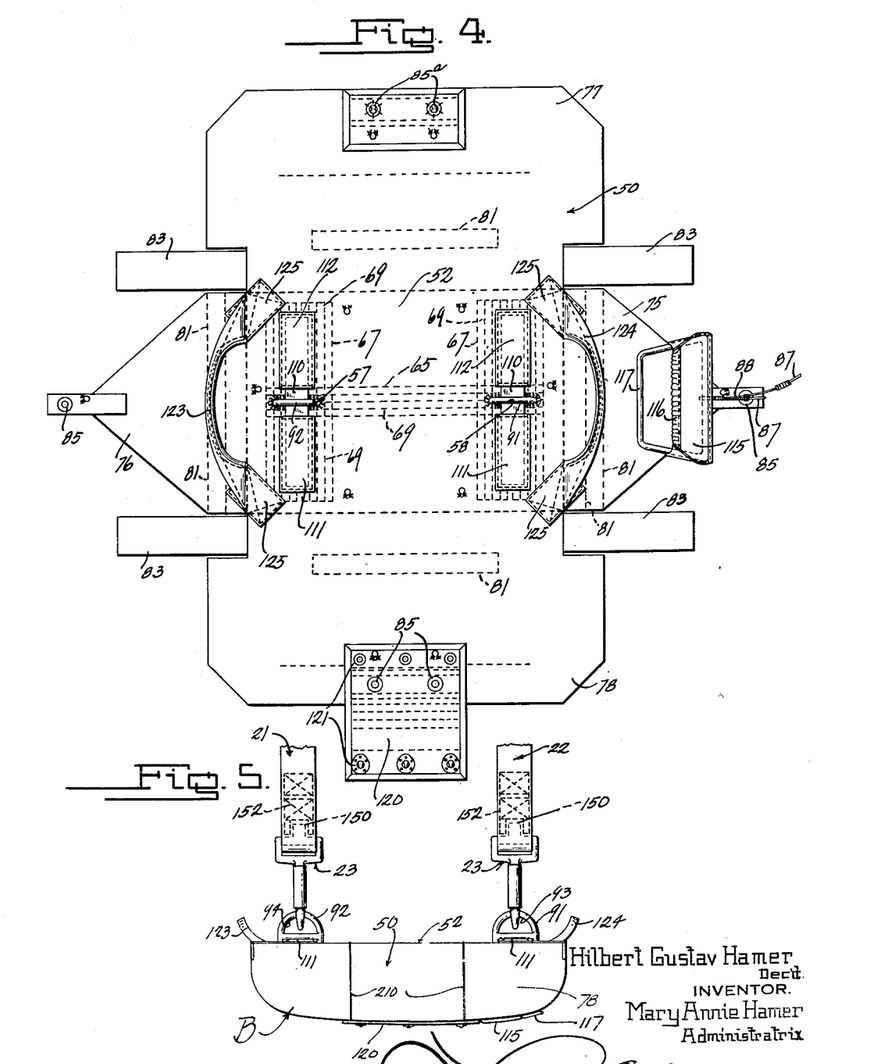
Figure 4 is a plan view of the exterior of the flexible parachute pack container with its flaps extended; more particularly illustrating the relation of the rip cord and the mounting of the connector parts with which the harness suspension straps are detachably associated.
Figure 5 is a side view of the parachute pack, in its compacted position with parachute folded therein, showing the relation in which the same is detachably connected to the suspension lines of the harness.
Figures 6, 7, 8:
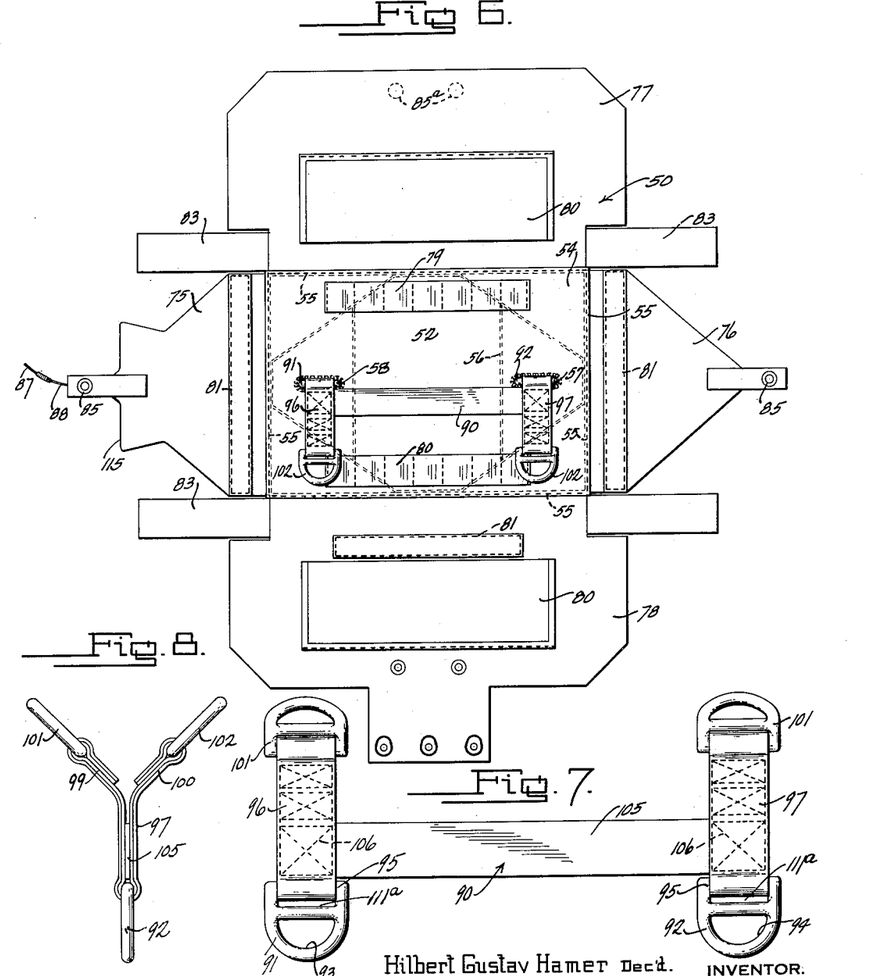
Figure 6 is a plan view of the interior of the parachute pack container with the flexible flaps extended, and more particularly showing the connector details associated with the container for attachment of the parachute shroud lines.
Figure 7 is a view showing the link connection which is mounted upon the parachute pack container and which links the parachute shroud lines and the harness in an operative assemblage.
Figure 8 is an end elevation of one of the connecting straps of the link assemblage of Figure 7.
Figures 9, 16:
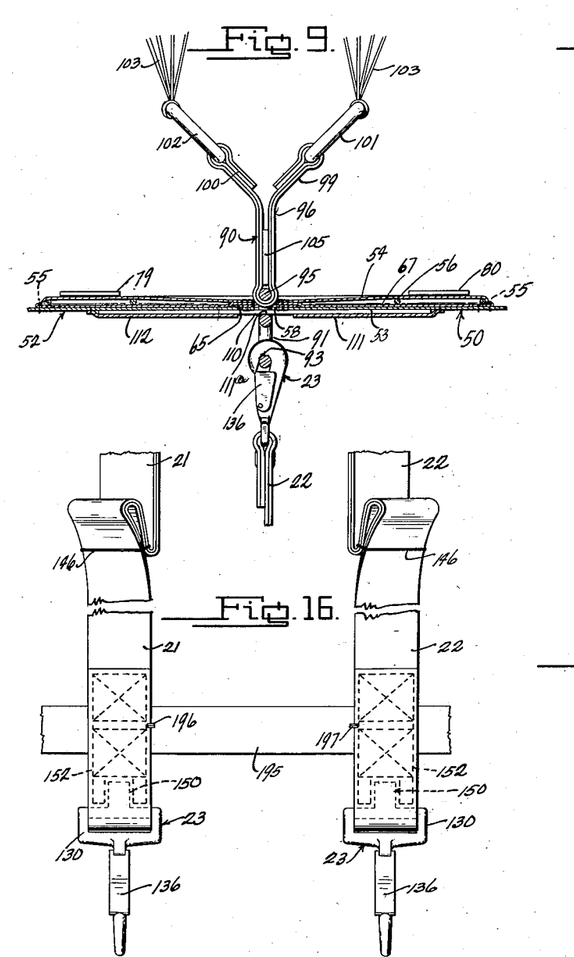
Figure 9 is a cross sectional view taken substantially on the line 9—9 of Figure 3, more particularly showing the relation of the connector assemblage of Figure 7 upon the means which fastens it to the pack container, and the connection therewith of the parachute shroud lines and fastener parts of the harness suspension lines.
Figure 16 is a modified form of associating the suspension lines upon the wearer for convenient adjustment in a releasable relation, in contradistinction to the attaching connections for the suspension lines as shown in Figure 1.

In Figures 4 and 6, are shown the opposite surfaces of the flexible container 50 which is used to enclose the parachute and shroud lines in forming the pack B shown in Figure 5. This flexible container 50 is generally of the shape and type of container set forth in the U. S. Ball Patent #1,554,192 which comprises a central polygonal shaped body portion or back 52, formed, as shown in the sectional view of Figure 9, of an outer layer 53 and an inner flexible layer 54, stitched peripherally at 55 to provide a pocket covering the entire area of the wall 52, wherein a wire frame 56, co-extensive with the pocket, is slipped to more or less rigidly hold the wall 52 in a plane against collapsing, and upon which the pack is formed to the shape of the same. This means of holding the back or body wall of the pack container in semi-rigid formation is a feature of the Floyd Smith Patents #1,367,723 and #1,403,983, and no novelty is claimed in the present invention therefor, except in the cooperative relation in which the wire frame is associated with the details of the connecting means between the parachute and harness. The wire frame 56 is slipped into the pocket at one end, and said end of the pocket stitched, to permanently enclose the frame in place in the pocket between the flexible layers 53 and 54 forming the body wall 52. Thereafter elongated slots 57 and 58 of button hole-like formation are provided through the wall 52, preferably along the medial line of the wall 52, longitudinally thereof; the slots 57 and 58 being provided thru both layers 53 and 54 of the wall 52, and as shown in Figure 19 of the drawings they are peripherally reinforced by means of button hole stitching 60 and reinforcing marginal chain stitching 61. A reinforcing strip 65, shown in section in Figure 9 and in dotted lines in Figure 4, is provided along the medial line of the body wall 52, extending from slot 57 to the slot 58, and at the ends intersecting the slots and providing marginal reinforcement for said slots, thru which the stitching 60 and 61 above mentioned extends. Furthermore, as shown in Figures 4 and 9 of the drawings, transverse reinforcing strips 67 are provided normal to the strip 65, in intersection with each of the slots 57 and 58, and of a length to reinforce certain pocketed portions adapted to receive the connector attaching steel strips 110 to be subsequently mentioned. The reinforcing strips 65 and 67 are preferably of waxed fabric, and of course interposed between the layers 53 and 54 of the body wall of the pack container, and are suitably longitudinally stitched, as shown by the dotted lines 69 in Figure 4 of the drawings.

The container 50 at opposite ends of the body wall 52 is provided with the flexible flaps 75 and 76, and along the opposite longitudinal edges the body wall 50 is also provided with other flexible flaps 77 and 78. Along the opposite longitudinal margins of the body wall 52, on the inside thereof, adjacent the hinge juncture of the flaps 77 and 78 there are provided strips of flexible material 79 and 80 suitably stitched to provide passageways or pockets, wherein the shroud lines are adapted to be packed in a zig-zagging relation substantially as mentioned in the Ball Patent #1,554,192 above mentioned.

In standard parachute pack construction, the suspension lines of the harness ordinarily extend into the container as set forth in the Ball patents above mentioned, and the shroud lines connected with the suspension lines are laid back and forth and tucked in the pockets. Thereafter the main parachute is folded in a zig-zag relation upon the top of the shroud lines, and the flaps of the container initially secured, and the pilot parachute packed in place between the flaps 77 and 78 and the auxiliary flaps 80 thereon, in order to separate the pilot parachute from the main parachute, as will be understood by those skilled in the operation of the present day standard parachute. The flaps when secured in a pack-like relation over the parachute apparatus compacted therein, define a sort of box-like container, and the flaps 75, 76, 77 and 78 are stiffened transversely by flexible steel strips in pocketed portions 81, on the insides of the flaps, as shown in Figures 4 and 6. Corner tongues 83 are provided at the opposite ends of the flaps 77 and 78 for building the corners of the pack container into box-like form; this also being a feature of the Ball Patent #1,554,192 above mentioned, except that no slotted provision is made for extension of the suspension lines of the harness into the pack container.

The exterior surface of the flap 77 is provided with a pair of transversely apertured cones 85ª, near the marginal edge, which are adapted to receive thereover the eyelets 85 at the free margins of the other flaps 75, 76 and 78; the transverse openings of the cones 85ª being adapted to receive flexible pin extensions 87 of a flexible rip cord 88 therethrough, in a manner well understood in the art, as a fastening means for the pack. The usual elastics 210 are provided on the pack container with hook and eye connections, at the ends thereof with the flaps adjacent their free ends and with the body wall 52 of the container, for throwing the flaps open when they are released by the rip cord, in an operation well understood by those familiar with this art, and as more particularly set forth in the Floyd Smith U. S. Patents #1,403,983, and #1,462,456.

Referring at this time to the means for connecting the parachute at its shroud lines in a releasable manner with the harness suspension lines in the vicinity of the parachute container, the connector device 90, detailed in Figures 7 and 8 of the drawings, may be used, comprising specially formed metal D-rings or loops 91 and 92, adapted for respective extension through the slots 57 and 58 of the pack container, so that the eye portions 93 and 94 respectively thereof extend normal beyond the outer surface of the wall 52, as more particularly shown in Figure 9 of the drawings, and with the inner bar portion 95 thereof at the inner side of the body wall 52, where the same receives the multi-fold straps 96 and 97 connected upon the rings 91 and 92 respectively. The straps 96 and 97 are of flexible fabric or other material, very strong, and at the ends of each remote from the rings 91 and 92 they are bifurcated to provide the relatively movable portions 99 and 100, shown in Figure 8, respectively receiving D-rings 101 and 102 thereon, thru which the bunched shroud lines 103 are connected, as shown in Figure 9. This divides the shroud lines of the parachute into four bunches, connected to the four D-rings 101 and 102 of the straps 96 and 97. The straps 96 and 97 are connected permanently together by means of a transverse connecting strap 105, suitably secured as by stitching 106 between the folds of the lengths forming the straps 96 and 97, and immediately adjacent the coupling rings 91 and 92. The strap portions 96 and 97 as well as the connecting webbing 105 all lie at the inside of the body wall 52, and are adapted to be packed flat upon the inside surface of said body wall; the shroud lines extending from their connection with the rings 101 and 102 and being tucked in the pockets of the strips 79 and 80, back and forth in a zig-zag relation, just as in conventional packing.

As shown in Figures 3 and 9 of the drawings, the D-rings 91 and 92 of the coupling device 90 are extended from the inside of the container wall 52 transversely thru the button hole-like slots 57 and 58 and held normal to the plane of the wall 52 by means of transversely extending steel fastening strips 110, which are mounted on the wall 52 and extend transversely thru the slots 111ᵃ of the D-rings, paralleling the bar portions 95, so that the eyes 93 and 94 of the D-rings extend entirely exteriorly of the pack container, for facile connection of the complementary fastener parts 23 of the harness A therewith. These steel strips 110 are flat, and held in pockets 111 and 112 disposed at opposite sides of the slots 57 and 58, suitably stitched in place, and snugly receiving the ends of the flattened steel strips 110 therein, as shown in Figures 4 and 9 of the drawings. The pockets 111 and 112 are opened in end facing relation adjacent the slots 57 or 58, as the case may be, and one remote end of one of the pockets 111 or 112 is open to permit the ready insertion of the steel or metal securing members 110, and thereafter it is sewn up. The cross dimensions of the retaining band 110 and the slot 111 of the respective coupling ring 91 or 92 are such as to rigidly position the latter against movement from its normal relation to the plane of the body wall 52 of the pack container.

Figure 2:
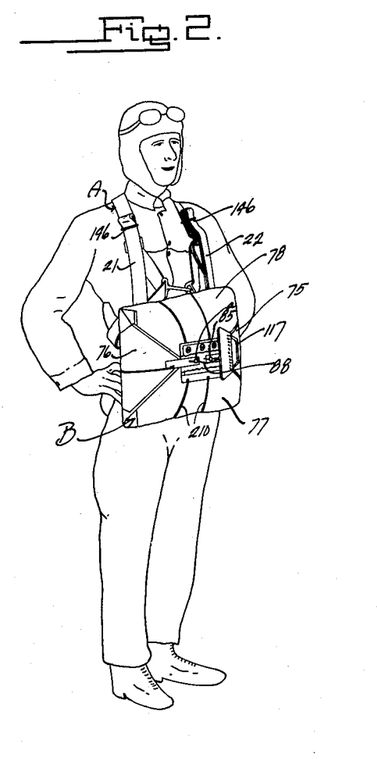
Figure 2 is a view showing the pack as operatively connected to the harness upon a wearer, and in position for emergency use.

The shroud lines and main and pilot parachutes are packed in conventional manner within the pack container 50, and the flaps folded over the compacted mass in the usual relation. A novel feature of the invention is the provision of a support for the rip cord on one of the normal side flaps of the container; that is, the flap 75, which as shown in Figure 4, is provided with a pocket 115, at the free end of the flap 75 on the exterior surface thereof, elongated parallel with the hinge line of said flap and having an elastic contractible opening 116, adapted to face toward the hinge end of the flap 75, for receiving a trapezoidally shaped rip cord handle 117, to which the rip cord 88 is connected and extended through a suitable opening in the bottom of the pocket 115, much in the same manner as that set forth in U. S. application, Serial No. 319,934, filed November 16, 1928; the pins 87 being adapted for extension thru the transverse openings of the studs 85 for holding the flaps in a compacted box-like mass in closing the main and pilot parachutes and shroud lines; the elastics at 210 throwing back the flaps, upon the operator pulling the rip cord ring 117 out of the pocket 115 and release the rip cord from connection with the fastener studs and eyelets of the flaps, in an operation well understood by those familiar with this art. The relation in which the rip cord is positioned with respect to an operator is shown in Figure 2, depending upon the manner in which the pack is connected by the operator to the harness; the rip cord ring being positioned either to the right or left side of the operator for facile operation. The conventional guard flap 120 may be provided on the flap 78 of the parachute pack container, adapted to be fastened by the complementary parts 121 of the ordinary "lift-the-dot" type of fastener, to protect the rip cord against accidental injury or removal from its fastenings.

To facilitate handling of the parachute pack when disconnected from the harness, flexible handles or strap loops 123 and 124, preferably of the same material as the fabric webbing, are secured exteriorly on the body wall 52 of the container, at opposite ends thereof; the said ends of said handles 123 and 124 being diagonally connected at 125, by reinforcement and stitching at the corners of the wall 52, so that the hand loop portions of the handles 123 and 124 extend beyond the ends of the container when in packed form, to facilitate hand hold and transportation without obstruction of parts of the handle upon other parts of the pack; the relation being shown in Figure 5 of the drawings.

Figure 10:
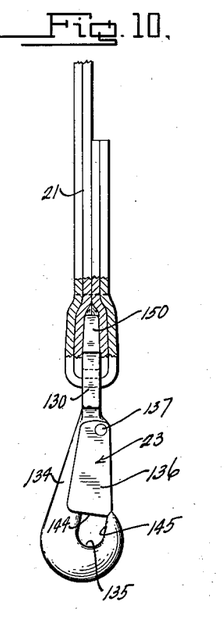
Figure 10 is a fragmentary view, partly in section, showing a snap fastener part as associated at the end of the harness suspension lines, and the means to maintain the same in a position where it may be quickly and easily operated.
Figure 11:
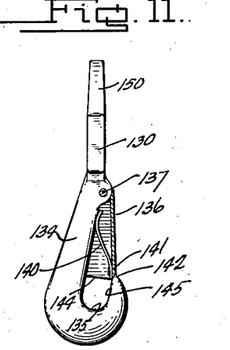
Figure 11 is a side elevation, partly in section, of the improved snap fastener of Figure 10.

The details of the snap fasteners 23 at the ends of the suspension straps 21 and 22 of the harness A are shown in Figures 10 and 11 of the drawings. This type of snap fastener 23 comprises a relatively flat polygonal shaped loop or ring portion 130, having an elongated eye 131, shown in Figures 1, 3 and 5 of the drawings, thru which the ends of the suspension straps 21 or 22, as the case may be, are threaded, and securely stitched at 133 to permanently connect the fasteners 23 in place thereon. The body loop 130 of each fastener 23 is provided at one side of the elongated loop with a substantially J-shaped hook 134, in the opening 135 of which the eye portion 93 or 94 of the rings 91 or 92 of the coupling device 90 is adapted to be received, to connect the complementary ring and fastener portions of the pack and harness, in a relationship which is apparent. The ordinary snap fastener, such as shown at 48 in Figure 3 of the drawings, is not well adapted for use in supporting the pack upon the harness, by reason of the force necessary to attach the ring of the pack thereto, involving the loss of considerable time before the flyer, at the time of peril, can make the connection. Other types of conventional J-shaped snap fasteners are unsuitable. Therefore, the special snap fastener 23 has been provided, which is not only safe, but easy to operate. It includes a substantially channel-shaped detent piece 136, pivoted at 137 on the upper end of the shank of the hook 134; the channel being adapted to receive the shank therein, and housing a sleeve spring 140 therein, which is secured at 141 in the channel of the hood 136, so that it cannot become injured or easily displaced. At its free end the hood 136 contacts against the tip of the hook 134, and retains the D-ring in the socket 135, since the lower edges 144 of the hood 136 are inclined at an angle of 90° or greater with respect to the inside edge 145 at the socket of the hook, to prevent disconnection of the D-ring when once slipped in the fastener and held therein by the spring urged detent 136.

Referring to the manner of holding the suspension lines upon the harness attached to the wearer, it is preferred that any undue length of webbing of the suspension lines 21 and 22, necessitated upon the respective harnesses, be taken up by doubling the harness suspension lines upon themselves adjacent the shoulders of the wearer, and securing the suspension lines in such double relation by break threads 146, shown in Figure 1 of the drawings, which readily snap loose at the time that the parachute opens to break the fall of the parachutist. The suspension lines 21 and 22 are extended forwardly of the wearer, downwardly along the chest, to adjacent the waist of the wearer. The ends of the suspension lines at the fasteners 23, are secured by break threads 147 stitched to the looped portions 40 and 41 of the harness as worn upon the jumper, (see Figure 1). Due to the fact that the webbing of the suspension lines 21 and 22 is flat, the same will lie closely in conformity to the body of the wearer, with the detents 136 of the snap fasteners 23 facing outwardly, as shown in Figure 1. To prevent the snap fasteners from pivoting at their connection with the webbed suspension lines 21 and 22, the loop 150 bodies 130 of the fasteners 23 are provided with reduced lugs 150, at the opposite side from the hooks 134 thereof, which are sewn into place between the double portions of the suspension line webbing, as more particularly shown in Figure 5 of the drawings; the stitching 152 extending downwardly through the webbing at opposite sides of the lugs 150 for holding the latter securely in place, so that the fasteners 23 are aligned with the suspension lines 21 and 22, and cannot be displaced. This insures that the fasteners 23 will at all times be in position for quick attachment of the coupling rings of the pack to the complementary fastener parts of the harness, even by an inexperienced individual.

Figure 12:
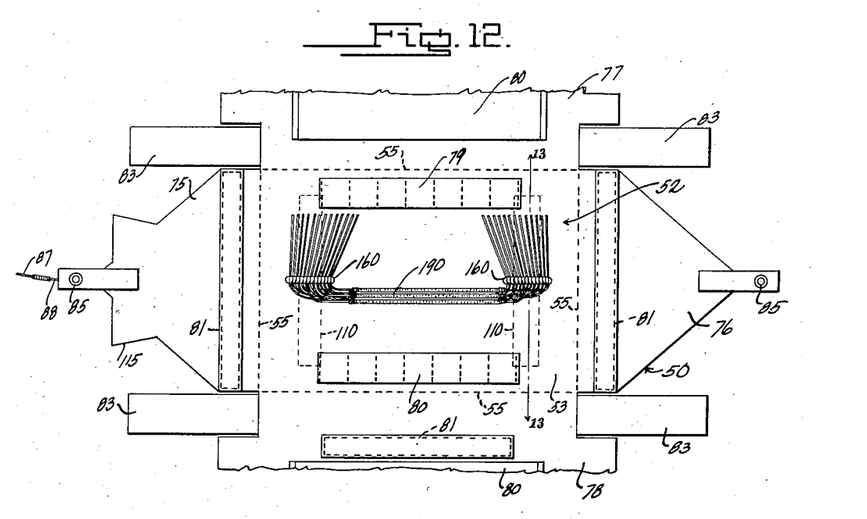
Figure 12 shows a modified arrangement for connecting the parachute shroud lines and the harness in an operative relation to the parachute pack container.
Figure 13:
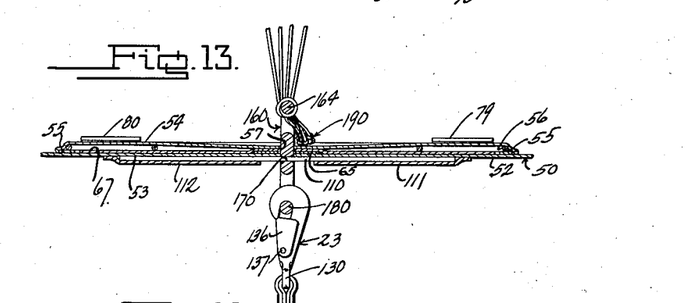
Figure 13 is a sectional view taken substantially on the line 13—13 of Figure 12, showing associated details of the modified connector arrangement.

In lieu of using the coupling device 90 of Figure 7, above described, a modified arrangement for connecting the shroud lines to the container, and detachably connecting the fasteners of the harness to the pack may be provided, more particularly shown in Figures 12 to 15 inclusive. This arrangement contemplates the use of two special coupling members 160, detailed in Figure 15, including the elongated eye portions 161 defining an elongated slot 163 therethrough, and having connected at one longitudinal edge thereof a modified D-ring or loop 164, in the plane therewith; the same having an eye opening 165 therethru. The loop 164 is of less length than that of the loop portion 161, defining shoulders 167 at the ends of the loop 161 which are adapted to engage the inside of the wall 52 of the pack container 50, beyond the ends of the slots 57 or 58 in which respectively positioned; the lengths of the loops 164 being of the same length as the button hole-like slots 57 and 58. This positions the elongated loop portions 161 of the coupling member 160 at the insides of the body wall of the pack container, whereupon the shroud lines may be connected in a manner to be subsequently mentioned. The other loop portions 164 extend normal from the exterior surface of the body wall of the container, providing eyes or rings for connection with the snap fastener parts 23 of the suspension lines, as shown in Figure 13. At the integral connection of the ring or loop portions 161 and 164 of the coupling member 160, there is a narrow elongated slot 170 adapted to receive therethrough the steel connecting strips 110, shown in dotted lines in Figure 12 of the drawings, and contained in the same relation above mentioned within pockets 111 and 112. Thus, a separate slot is provided in the metal ring or connector 160, for the steel or other metal connecting bands 110, for a very efficient connection of the coupling members 160 on the body wall of the pack container, so that the rings 164 extend exteriorly of the pack container for complementary cooperation with the fastener parts 23 of the harness, and with the longer loop portions 161 at the interior of the container wall for connection with the shroud lines.

Figure 14:
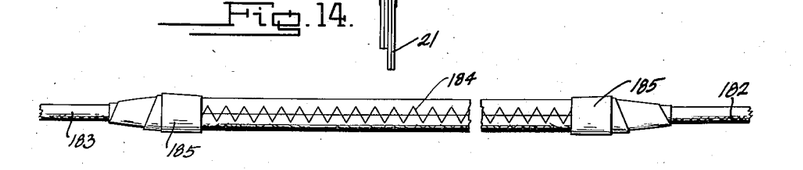
Figure 14 is a fragmentary enlarged view showing the manner in which the shroud lines are interconnected in a safety relation in the modified connection of Figure 12.
Figure 15:
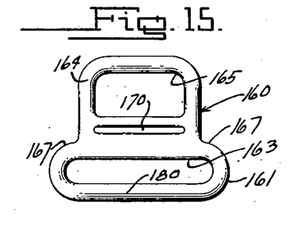
Figure 15 is an elevation of a modified type of metal connecting member as used in the form of invention shown in Figures 12 to 14 inclusive.

The shroud lines of the parachute are brought together in evenly divided manner, into two bunches; one bunch being connected to one of the couplings 160, and the other being connected to the other coupling 160, as shown in Figure 12. The shroud lines of the two bunches are individually connected to the loop portions 161 of the respective rings 160 by bringing the same in a single knot about the bar portion 180 shown in Figure 15, with the so called "half hitch" connection; and therefrom the free ends of the shroud lines of one set being connected with the ends of the lines of the other set, as shown in Figure 12 of the drawings, in a permanent relationship. Thus, the manner of connection is shown in Figure 14, with a free end of a shroud line 182 of one bunch of shroud lines, extending from its connection with a coupling member 160 in overlapped relation with the free end portion of a second shroud line 183 extended from the other bunch of shroud lines connected to the other coupling member 160. The overlapping ends of the shroud lines 182 and 183 are connected together by zig-zag stitching 184, or any other type of stitching, and the free ends of the connected portions of the shroud lines are guarded by adhesive tape 185 spirally rolled thereabout. This transverse coupling arrangement of the ends of the shroud lines of the two sets provides a transverse bunched connection shown at 190 in Figure 12 of the drawings, which is very strong. It is equivalent to the webbing construction 105 of the form of coupling 90 above described, although probably stronger. A pull upon the shroud lines will permit the single knotted connection of the same on the bar 180 to slip, so that strains occurring on one set of shroud lines will be partially transmited to the other set of shroud lines, in order to maintain the connection 190 taut and insure that there will be a distribution of the load upon both of the coupling members 160.

In a modified connection of the suspension lines 21 and 22 of the harness, upon the body of the wearer, shown in Figure 16, it is preferred to provide a body encircling belt 195, which preferably has no other positive connection with the harness, but is of ordinary belt formation, adapted to be slipped at any location vertically about the body of the wearer. It may have an adjustable buckle and eyelet connection if desired, and on a portion thereof the ends of the suspension lines 21 and 22 are spaced and releasably connected by means of break threads 196 and 197, as shown in Figure 16 of the drawings.

In a further type of connection for maintaining the suspension lines upon the wearer's harness in an out of the way relation when not in use, a supporting strap 200 may be provided, having sockets 201 at the ends thereof for detachable connection with any of a plurality of studs 202 secured in series along the vertical portions of the sling of the body harness of the wearer, as shown in Figure 17. Thus, the strap 200 may be secured at any desired elevation at the front of the wearer, and the ends of the suspension lines 21 and 22 adjacent the fasteners 23 may be permanently connected to the cross portion strap 200, or connected by break threads 205 therewith, as shown in Figure 17. The fasteners comprising the complementary parts 201 and 202 may be of the so-called "lift-the-dot" fastener type, and the male and female portions may be interchanged as desired upon the harness sling lines and strap portion 200.

The use of the apparatus will be apparent from the foregoing. The pack will be conveniently carried upon the aircraft detached from the flyer's harness. It may be supported adjacent to the flyer's seat or in a predetermined location in the cabin or cockpit of the plane. When a jump is to be made, or becomes necessary, the operator grasps the pack, with the semi-rigid body wall 52 of the container facing him, and by pressing the projecting connector ring portions 91, 92, or 164, as the case may be, against the detents 136 of the fasteners 23, the metal coupling parts of the pack are quickly and easily connected to the fasteners 23. This places the parachute pack in position upon the harness, and it is merely necessary for the operator to jump from the aircraft, await the predetermined interval, and pull the rip cord by means of the handle 117. The flaps will then be released and thrown open by their elastics shown at 210 in Figure 2 of the drawings, and the pilot parachute, in event one is used, will open and anchor in the air, drawing the main parachute into string-like form, which subsequently opens. The shroud lines pull out from the pockets in which they are tucked, and as they tighten the bunches of shroud lines at their connections with the pack container will draw the latter upwardly along the body of the wearer, causing the break cords 147 of the form of invention shown in Figure 1 to rip from the harness, and breaking the cords 146, to position the parts in the relation shown in Figure 3 for supporting the parachutist. In event the form of invention shown in Figure 17 is used the break cords 196, 197 and 146 tear loose to position the parts as shown in Figure 3. In event the form of invention shown in Figure 18 is used the strap 200 becomes disconnected at its ends from the complementary fastener portions on the body harness of the wearer, to position the parts in proper relation for supporting the jumper in the harness.

A very important feature of the invention resides in the fact that even though the flyer has had only sufficient time to connect one of the fasteners 23 with one of the complementary coupling rings on the pack, he nevertheless will be saved by a correct opening of the parachute, because the parachute shroud lines are suitably bunched in spaced relation at the inside of the pack, and connected by transverse coupling straps 105 in the form of invention shown in Figure 7, and the connections 190 shown in the form of invention of Figure 12. Thus, the parachutist will be saved in practically the same manner as though a two-point connection of the pack with the harness has been made, although, of course, not as satisfactory.

It is within the range of this invention to utilize complementary parts of a bayonet joint connecting type of coupling between the pack container and harness suspension straps.

From the foregoing description of this invention it is apparent that improved parachute apparatus has been provided, by means of which a unitary pack may be safely, conveniently, and quickly attached to a parachute harness.

Various changes in the shape, size, and arrangement of parts may be made to the forms of invention herein shown and described, without departing from the spirit of the invention or the scope of the claims.

I claim:

1. In parachute apparatus of the free jump type the combination of harness attachable to the body of an individual, a unitary pack for quick emergency attachment to the harness including a container, a parachute packed in the container having shroud lines securely connected with the container, rip cord means for manual release of the container to free the parachute, and complementary relatively detachable fastener parts in fixed definite positions upon the harness and container.

2. In a parachute pack the combination of a container, shroud lines connected to a parachute for packing in the container, the shroud lines being sub-divided at the container into a plurality of bunches, and coupling means securing the shroud lines to the container at the normal inside of the container in said bunched relation, said coupling means extending through the container exteriorly thereof and providing exterior fastening parts.

3. In a parachute pack a container adapted to house a parachute canopy, shroud lines secured with the parachute canopy, a plurality of connecting rings mounted upon the container including portions at the inside of the container and other portions at the outside of the container, means connecting the shroud lines to the portions of the rings at the inside of the container, the portions of the rings at the outside of the container comprising fastener parts for attachment to a wearer.

4. In a parachute pack a container adapted to house a parachute canopy, shroud lines connectable with the parachute canopy, a plurality of connecting rings mounted upon the container including portions at the inside of the container and other portions at the outside of the container, means connecting the shroud lines to the portions of the rings at the inside of the container, the portions of the rings at the outside of the container comprising fastener parts for attachment to a wearer, and rip cord means to releasably hold the container closed with the parachute canopy and shroud lines compacted therein.

5. In a parachute pack a container adapted to house a parachute canopy, shroud lines connectable with the parachute canopy, a plurality of connecting rings mounted upon the container including portions at the inside of the container and other portions at the outside of the container, means connecting the shroud lines to the portions of the rings at the inside of the container, the portions of the rings at the outside of the container comprising fastener parts for attachment to a wearer, rip cord means to releasably hold the container closed with the parachute canopy and shroud lines compacted therein, said rip cord means including a handle portion releasably carried by a part of the container.

6. In a parachute pack the combination of a container adapted to house a parachute canopy in a releasable relation, shroud lines for the parachute canopy segregrated adjacent the container into a plurality of bunches, individual fastening means connected directly to the container for fastening the bunches of shroud lines in spaced bunches within the container, and means at the inside of the container connecting said fastening means and line bunches in a cooperative load supporting relation.

7. In a parachute pack the combination of a container adapted to house a parachute canopy in a releasable relation, shroud lines for the parachute canopy segregated adjacent the container into a plurality of bunches, individual fastening means connected directly to the container for fastening the bunches of shroud lines in spaced bunches within the container, means at the inside of the container connecting said fastening means and shroud lines in a load supporting relation, and fastener parts exteriorly on the container for releasable connection with complementary parts of a harness.

8. As an article of manufacture a parachute pack container comprising a body portion having closure means associated therewith, means to releasably hold said closure means shut to close the container for housing a parahute therein, and parachute shroud line fasteners securely connected with the body portion of the container and disposed at the inside thereof for attachment of said parachute shroud lines to the body portion.

9. As an article of manufacture a parachute pack container comprising a body portion having closure means associated therewith, means to releasably hold said closure means shut to close the container for housing a parachute therein, parachute shroud line fasteners connected with the body portion of the container and disposed at the inside thereof for the securement of said parachute shroud lines to the body portion, and fastener parts secured on the exterior surface of the body portion for attachment to complementary parts of a wearer's harness.

10. A parachute pack container assemblage including a body portion, and a metal coupling member secured to the body portion including ring fastener parts at the inside of the body portion and exteriorly thereof for respective connection with parachute shroud lines and a wearer's harness.

11. In a free jump type parachute pack a container assemblage including a wall of the container having coupling means secured therewith including fastener portions for the shroud lines at the inner side of the wall and fastener portions for the harness at the outer side of the wall.

12. In a parachute pack a container having a wall with openings transversely therethrough, a coupling member having a transverse aperture therein, the coupling member being disposed in said opening of the wall of the container with the transverse aperture thereof adjacent the plane of the wall of the container, an elongated fastener member secured to the wall of the container and extending thru the transverse aperture of the coupling member for holding the coupling member in a fixed relation upon the wall, the coupling member in such relation having looped portions at opposite sides of the wall, and means for connecting parachute shroud lines to the looped portion of the coupling member at the inside of the wall.

13. In a parachute pack a container having a wall provided with a transverse opening therein, a metal coupling member provided with loop apertures transverse to the plane thereof, and a metal fastening secured on the wall of the container transversely across the opening in the wall of the container and extending through a loop aperture of the coupling member for holding the coupling member upon the wall with loop apertures exposed at the inside and outside of the wall.

14. In a parachute pack a container having a wall provided with a transverse opening therein, a metal coupling member provided with loop apertures transverse to the plane thereof, a metal fastening secured on the wall of the container transversely across the opening in the wall of the container and extending through a loop aperture of the coupling member for holding the coupling member upon the wall with loop apertures exposed at the inside and outside of the wall, the wall having a second opening therein, and a second coupling member similar to the above mentioned coupling and metal fastener secured to the second coupling member in the same relationship on the wall as the first coupling member, and parachute shroud lines connected with the inside loop apertures of said coupling members and including a connection with the shroud lines at the two coupling members at the inside of the container.

15. As an article of manufacture a flexible parachute container including a flexible body portion reinforced by a wire frame which holds it in semi-rigid form, the body portion having elongated slots therethrough of reinforced button hole-like construction, said body portion at opposite sides of each of the button hole-like slots having pockets, a metal strap disposed in said pockets for each of the button hole-like slots and extending transversely across the respective slots, and shroud lines and harness coupling members extending through each of said slots and secured therein by said metal straps, each coupling member, both exteriorly of and interiorly of the wall on which they are mounted having apertured portions for connection with the parachute and harness details of parachute equipment.

16. In parachute apparatus a container including a wall and releasable closure means associated therewith, a plurality of spaced coupling rings secured on said wall at the inside thereof, and parachute shroud lines connected in a plurality of bunches leading to said coupling rings, said parachute shroud lines having yieldable connection with their respective coupling rings, and the shroud lines connected to one of the coupling rings extending at their ends in overlapped relation with the ends of the shroud lines connected to another coupling ring and being secured therewith in a fixed reinforced connection.

17. In parachute apparatus a coupling link structure adapted to be interconnected between harness apparatus and parachute shroud lines comprising a pair of substantially parallel flexible straps having connecting rings at opposite ends thereof, and a flexible cross member connected to said straps between the respective rings thereon.

18. In a parachute pack a container including a body wall, spaced coupling rings fixedly connected on the body wall and extending exteriorly of the body wall for releasable connection with a harness, said rings having portions at the inside of the body wall, flexible straps connected with the portions of said rings at the inside of the body wall, shroud line connecting rings on the free ends of said flexible straps at the inside of the body wall, and a flexible load transmitting strap connected between the said flexible straps at the inside of the body wall.

19. A parachute harness comprising a substantially U-shaped sling having means attaching it to a wearer in such relation that the sling is disposed about the seat of the wearer and extends upwardly along the body and at its free ends provides suspension straps, said suspension straps at the terminals thereof having quick connector fastenings for detachable connection with a parachute, and releasable means holding the outer ends of the suspension straps on the wearer at the front of the wearer with the fasteners facing in definitely fixed position for quick pack attachment.

20. In parachute apparatus a harness attachable to the body of a wearer and having elongated suspension straps connected therewith attachable with the harness in the vicinity of the shoulders of the wearer, releasable fastener parts at the terminals of said suspension straps for emergency attachment of a parachute pack and releasable means connecting said suspension straps near their free ends with other parts of the harness with the fastener parts in position for quick pack attachment.

21. In parachute apparatus a harness attachable to the body of a wearer and having elongated suspension straps connected therewith attachable with the harness in the vicinity of the shoulders of the wearer, releasable fastener parts at the terminals of said suspension straps for emergency attachment of a parachute pack, releasable means connecting said suspension straps in a depending relation along the front of the wearer with the fastener parts in position for quick pack attachment, said suspension straps extending for sufficient lengths upon the wearer so as to position the fastener parts below the chest of the wearer whereby the pack when attached thereto will not obstruct the upper part of the trunk or face of the wearer.

22. In parachute equipment a wearer's harness having a plurality of suspension lines with snap fasteners at the free ends thereof, means positioning the suspension lines in operative relation forwardly upon the wearer's person with the snap fasteners spaced in a predetermined relation, and a parachute pack including a container with secured rings affixed directly and exteriorly thereon and spaced for complementary connection with the snap fasteners of the harness.

23. Parachute harness including suspension webs of a length suitable for extension from the shoulders of the wearer upwardly at opposite sides of the head of the wearer for a considerable distance above the wearer, and means for releasably holding the suspension webs inactive upon the body of the wearer including an individual belt to which the webs are connected.

24. Parachute harness including suspension webs of a length suitable for extension from the shoulders of the wearer upwardly at opposite sides of the head of the wearer for a considerable distance above the wearer, and means for inactively holding the suspension webs comprising a belt to which the webs are connected in a releasable relation.

25. In parachute apparatus the combination of a container, a plurality of relatively spaced coupling members upon said wall at the inside of the container, parachute shroud lines connected in separate bunches in looped slidable relation about said coupling members, the ends of the shroud lines which are secured to one of the coupling members being fixedly connected individually to the ends of the shroud lines connected to the other coupling member whereby to facilitate symmetrical disposition of the shroud lines and proper load distribution thereon during a parachute descent.

26. Parachute harness including suspension webs of a length suitable for extension from the shoulders of a wearer upwardly at opposite sides of the head for a considerable distance above the wearer's head, and means for releasably holding the suspension webs inactive upon the body of the wearer including a strap connected with the ends of the suspension webs and having releasable connection with the harness below the shoulders of the wearer.

27. In parachute apparatus a harness attachable to a body of the wearer having a parachute canopy suspension strap connected therewith of a nature to extend above the head of the wearer during a parachute descent, means for releasably securing the said suspension strap near its free end upon the body of the wearer in releasable inactive position, a parachute pack, and quick attaching means for releasably connecting the pack to the free end of said suspension strap.

28. In parachute apparatus a harness for the body of the wearer having a suspension strap connected therewith of the type adapted to extend above the head of the wearer during a parachute descent, a quick connector part at the free end of the suspension strap for emergency attachment of a parachute pack thereto, and releasable means securing the suspension strap near its free end in such manner as to operatively present the fastener part thereon in position for quick pack attachment.

29. In parachute apparatus a body harness having a coupling part thereon in definitely fixed position, and an emergency parachute pack of quick attachable free jump type having a container with a rigid complementary coupling part in definitely fixed non-movable position thereon whereby an operator may grasp the pack and relatively affix the complementary coupling parts in secured relation without the necessity of fumbling directly with the coupling parts.

30. In a parachute apparatus, a body harness having a coupling part thereon in definitely fixed position, and an emergency quick attachable free jump parachute pack having a container with an external rigid complementary coupling part in definitely fixed non-movable position thereon for quick attachment to the coupling part of the body harness, said pack coupling part having a portion extending into the container, the pack including a parachute having shroud lines connected with said portion within the container.

MARY ANNIE HAMER,
*Administratrix of the Estate of Hilbert Gustav Hamer, Deceased.*